UNITED STATES PATENT OFFICE.

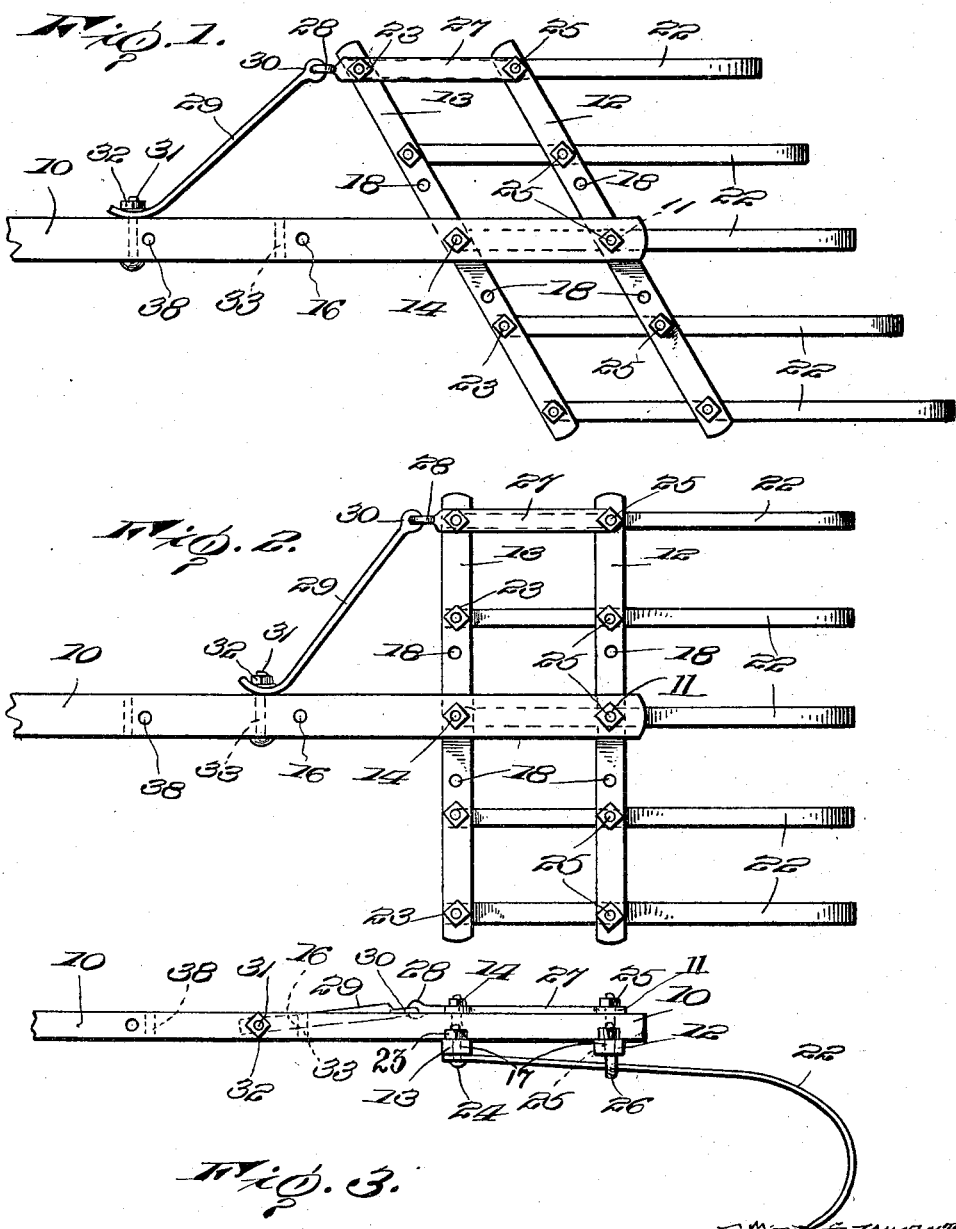

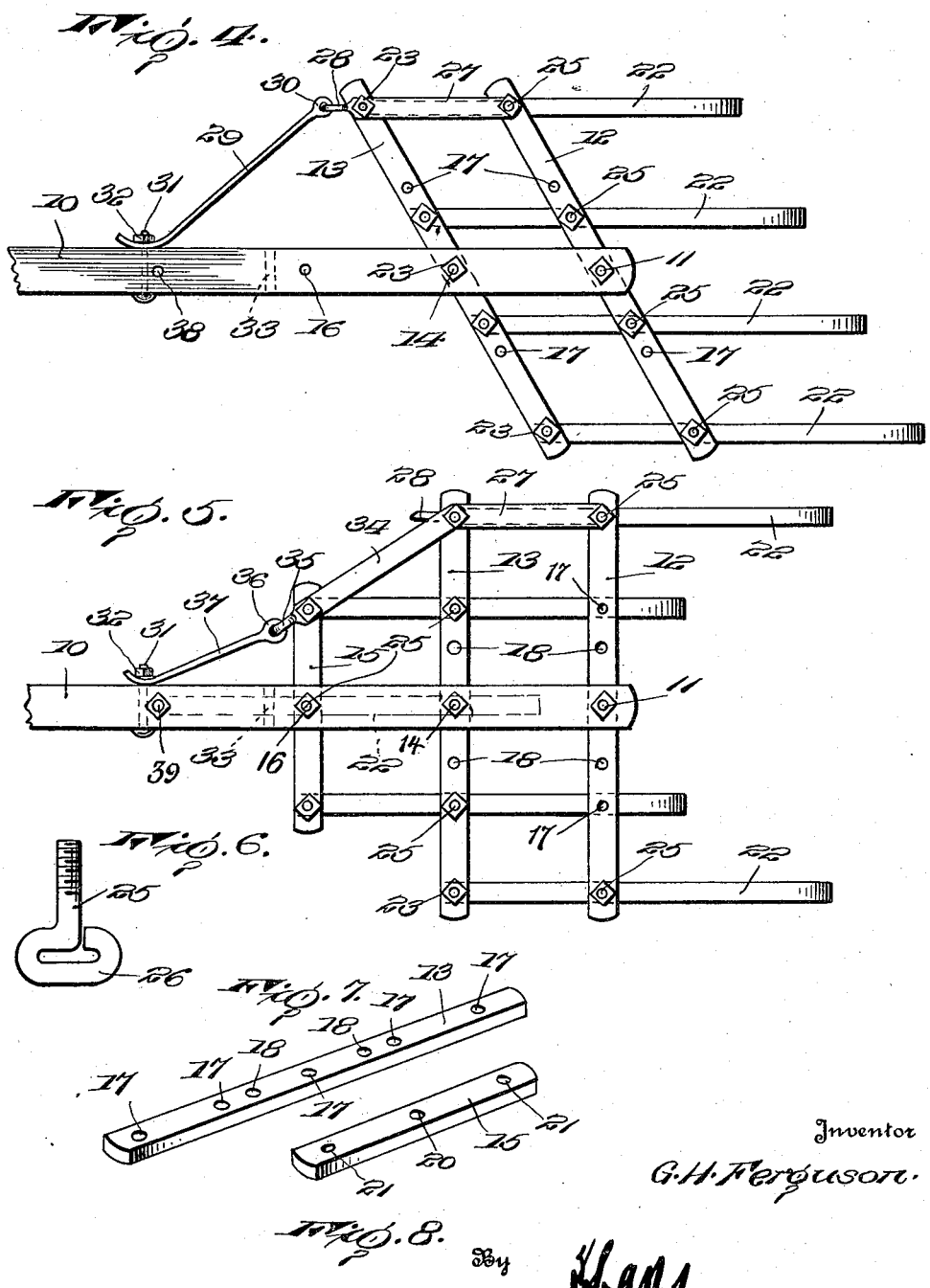

GILBERT H. FERGUSON, OF SAMANTHA, ALABAMA.

HARROW.

1,274,866.

Specification of Letters Patent.

Patented Aug. 6, 1918.

Application filed December 3, 1917. Serial No. 205,060.

*To all whom it may concern:*

Be it known that I, GILBERT H. FERGUSON, a citizen of the United States, residing at Samantha, in the county of Tuscaloosa and State of Alabama, have invented certain new and useful Improvements in Harrows, of which the following is a specification.

This invention relates to improvements in harrows, and has for one of its objects to provide a simply constructed adjustable harrow wherein provision is made for adjusting the tooth supporting members to control the distance between the lines of travel of the same and to produce a side or center draft harrow, as required.

With these and other objects in view, the invention consists in certain novel features of construction, as hereinafter shown and described and then specifically pointed out in the claims; and in the drawings illustrative of the preferred embodiment of the invention—

Figure 1 is a plan view of the improved harrow with the tooth supporting beams arranged obliquely to the longitudinal axis of the draft tongue.

Fig. 2 is a view similar to Fig. 1 with the tooth supporting beams arranged substantially at right angles to the draft tongue.

Fig. 3 is a side elevation of the device arranged as shown in Fig. 2.

Fig. 4 is a view similar to Fig. 1 illustrating the device arranged with a lesser number of teeth.

Fig. 5 is a plan view of the device arranged as an A harrow.

Fig. 6 is an enlarged detached view of one of the tooth clamping devices.

Fig. 7 is a detached perspective view of one of the longer tooth supporting beams.

Fig. 8 is a detached perspective view of the shorter tooth-supporting beam.

The improved device includes a tongue 10 to which the draft appliances, not shown, are attached. Pivoted at 11 to the tongue 10 at its rear end is a tooth supporting beam 12, while a similar beam 13 is pivoted at 14 to the tongue in advance of the pivot 11. When the device is to be arranged as an A harrow a third and shorter beam 15 is employed and pivoted at 16 to the tongue 10 forwardly of the pivots 11—14, the three pivots being located at uniform distances apart.

The tongue 10 is also provided with another bolt receiving aperture 38 forwardly of the aperture 16 as shown, to receive a tooth-holding bolt when the device is arranged as an A harrow, as hereafter explained.

The beams 12—13 are each provided with a plurality of apertures 17 spaced at uniform distances as shown in Fig. 7, and with surplus apertures 18 spaced at substantially equal distances from the central aperture 17. The shorter beam 15 is provided with a central aperture 20 and terminal apertures 21, the latter apertures being spaced at the same distances from the central aperture 20 as the intermediate apertures 17 are spaced from the central aperture 17 of the beam 13.

The teeth of the improved harrow are preferably of spring form, as represented at 22, and are precisely alike. Each of the teeth is apertured at its forward end to receive a clamp bolt extending through the apertures of the beams 13 and 15, and by increasing or decreasing the number of teeth the operation of the harrow may be varied to adapt it to the condition of the soil upon which it is operating. By providing a plurality of the teeth and a plurality of the beams with their numerous apertures, the arrangement of the teeth relative to the beams may be varied as required, and as illustrated in the drawings.

In its simpler form, as shown in Fig. 1, five of the teeth are employed with the beams 12—13 held obliquely to the longitudinal axis of the tongue 10 and with the points of the teeth operating in a correspondingly oblique direction. In Fig. 2 five of the teeth are shown with the beams 12—13 held substantially at right angles to the tongue. In Fig. 4 four teeth are shown at uniform distances apart with the beams 12—13 oblique to the longitudinal axis of the tongue and supporting four of the teeth. It will be noted that in all the various arrangements of the device the teeth are spaced at uniform distances with their spaced distances varying in length. For instance in the arrangement shown in Figs. 1 and 2 the teeth are coupled only to bolts passing through the apertures 17. In Fig. 4 the outer teeth are coupled by clamp bolts extending through the apertures 17 and two of the teeth coupled by clamp bolts extending through the apertures 18. In the last described arrangement the central tooth is discarded.

In Fig. 5 the device is shown with the teeth arranged to produce an A harrow in which the outer teeth 22 are coupled to the outer ends of the beams 12—13, one pair of the teeth coupled to the outer ends of the beams 15 and to the beam 13 by clip devices engaging through one pair of the apertures 17, and a fifth or central tooth connected by a bolt 39 engaging through the aperture 38, and a clip device engaging through the aperture 20 of the beam 15 and the aperture 16 of the tongue. By this arrangement the points of the teeth are disposed in V-shape, or forming what is commonly known as an A harrow.

The clamp bolts by which the forward apertured terminals of the teeth are secured to the beams are of the ordinary form with nuts 23 at one end and heads 24 at the other ends. Where the teeth 22 pass beneath the beams rearwardly of their forward ends they are coupled by clip devices to the rearward beam in Figs. 1, 2, 3, and 4, and in Fig. 5 the teeth which are connected to the shorter beam 15 are supported by clips from the forward longer beam 13, as indicated, while the central tooth, as before described, is coupled by one of the clip devices engaging through the beam 15 and tongue 10. One of the clip devices is illustrated in Fig. 6, and comprises a threaded standard 25 and a slotted head 26 through which the intermediate portions of the teeth extend. The standards 25 extend through the beams 12—13 and 15 while the central standards likewise extend through the tongue 10, as shown in Figs. 1, 2, and 5. Thus by furnishing a plurality of teeth, clamp bolts and the clip devices, the teeth may be readily arranged as shown in the various figures by merely transposing the bolts, clip devices and teeth, as will be obvious.

At one end the beams 12—13 are coupled by a holding strap 27, the latter being engaged by the terminal clamp bolt of the beam 13 and the terminal standard 25 of the beam 12. At its front end the strap 27 is extended into an eye 28 with which a rod 29 is swingingly coupled by a corresponding eye 30. At its forward end the rod 29 is apertured to receive a clamp bolt 31 extending through the tongue and held in position by a clamp nut 32. The tongue 10 is provided with another aperture 33, to receive the clamp bolt 31 when the beams 12—13 are disposed at right angles to the tongue as shown in Fig. 2. By this means the beams are rigidly supported in position relative to the tongue. When the parts are arranged as shown in Fig. 5 another strap 34 is coupled at one end to the same terminal bolt which holds the front end of the strap 27, and is coupled at its other end by the adjacent terminal bolt of the shorter beam 15. The strap 34 is extended at its front end into an eye 35 with which a similar eye 36 on a rod 37 engages. At its forward end the rod 37 is provided with an aperture to receive the clamp bolt 31 and is held in place by the clamp nut 32. The rods 29—37 are substantially alike except that the rod 37 is shorter than the rod 29.

The standards 25 being rotatable in the beams and tongue, will readily rotate when the beams are adjusted to a position oblique to the tongue, as shown in Fig. 1 and thus avoid cramping the parts.

Having thus described the invention, what is claimed as new is:

A device of the class described comprising a draft tongue, a plurality of beams with certain of said beams having apertures in spaced relation, means for swingingly connecting said beams to said draft tongue in spaced relation, a plurality of cultivator teeth adjustably connected to the apertures of said beams, a strap device connecting said beams at one end and extended into an eye at the other end, and a connecting member having an eye at one end engaging the eye of the strap and connected at the other end to said draft tongue.

In testimony whereof I affix my signature.

GILBERT H. FERGUSON.

Copies of this patent may be obtained for five cents each, by addressing the "Commissioner of Patents, Washington, D. C."